United States Patent [19]

Murakami

[11] 4,355,843
[45] Oct. 26, 1982

[54] PILLAR CONSTRUCTION FOR MOTOR VEHICLE

[75] Inventor: Tetsuro Murakami, Hiroshima, Japan

[73] Assignee: Toyo Kogyo Co., Ltd., Hiroshima, Japan

[21] Appl. No.: 194,279

[22] Filed: Oct. 6, 1980

[30] Foreign Application Priority Data

Oct. 16, 1979 [JP] Japan ............... 54/143430[U]

[51] Int. Cl.³ .............................................. B60J 7/02
[52] U.S. Cl. .................................. 296/201; 98/2.17; 296/213
[58] Field of Search ............ 296/201, 202, 213; 280/756; 98/2.14, 2.15, 2.17

[56] References Cited

U.S. PATENT DOCUMENTS

| | | | |
|---|---|---|---|
| Re. 28,876 | 6/1976 | Notestine | 280/756 |
| 2,991,120 | 7/1961 | Barenyi | 296/213 |
| 3,198,572 | 8/1965 | Stolarczyk | 296/201 |
| 3,222,101 | 12/1965 | Belsky | 296/201 |
| 3,647,258 | 3/1972 | Porsche | 280/756 |
| 3,972,558 | 8/1976 | Horn | 296/213 |

Primary Examiner—Richard A. Bertsch
Assistant Examiner—John A. Carroll
Attorney, Agent, or Firm—Wenderoth, Lind & Ponack

[57] ABSTRACT

An improved pillar construction for use in a motor vehicle which includes a pillar inner panel and a pillar outer panel rigidly combined to each other so as to define a closed cross section. The pillar inner panel is formed with a raised portion of arcuate cross section extending along an entire length of the pillar inner panel and protruding toward the interior of the motor vehicle, with a reinforcing pipe member of metallic material being welded along the inner surface of the raised portion so as to provide the pipe member fixed to the interior of the closed cross section defined by the pillar inner panel and pillar outer panel for reinforcement of the pillar.

5 Claims, 3 Drawing Figures

PILLAR CONSTRUCTION FOR MOTOR VEHICLE

BACKGROUND OF THE INVENTION

The present invention generally relates to a motor vehicle and more particularly, to a pillar construction for use in a motor vehicle.

Generally, pillars for a motor vehicle, for example, front windshield pillars, rear windshield pillars, etc. tend to give rise to vibrations of the vehicle body especially during running of the motor vehicle at a high speed, if they are low in strength and rigidity, and particularly in a motor vehicle of a type in which an opening is formed in the vehicle roof for selective opening or closing by a cover plate member so as to provide the so-called sun roof, detachable roof, etc., the strength of the vehicle roof is liable to be reduced, and thus, it becomes essential to increase the overall strength of the pillars.

Conventionally, for improving the strength of pillars, it has been a general practice to increase the cross-sectional width of a pillar or to provide a stepped or rib portion along the entire length of the pillar, but such a practice not only limits good visibility through the windshield, but has been undesirable from the viewpoint of appearance.

SUMMARY OF THE INVENTION

Accordingly, an essential object of the present invention is to provide a pillar construction for a motor vehicle which has an improved high strength with sufficient rigidity, without an increase in dimensions, particularly in the width of the pillars.

Another important object of the present invention is to provide a pillar construction for a motor vehicle as described above which is simple in structure and highly reliable, and can be readily incorporated into motor vehicles of various types at low cost.

In accomplishing these and other objects, according to one preferred embodiment of the present invention, there is provided an improved construction of a pillar for use in a motor vehicle which comprises a pillar inner panel and a pillar outer panel rigidly combined with each other so as to define a closed cross section therebetween. The pillar inner panel is formed with a raised portion of arcuate cross section extending along the entire length of the pillar inner panel and protruding toward the interior of the motor vehicle, with a reinforcing pipe member of metallic material being welded along the inner surface of the raised portion so as to fix the pipe member to the interior of the closed cross section defined by the pillar inner panel and pillar outer panel for reinforcement of the pillar.

By the arrangement according to the present invention as described above, a novel pillar construction for motor vehicles having high strength and ample rigidity has been advantageously provided without necessity for increasing the width of the pillars, with substantial elimination of disadvantages inherent in the conventional pillar constructions of this kind.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
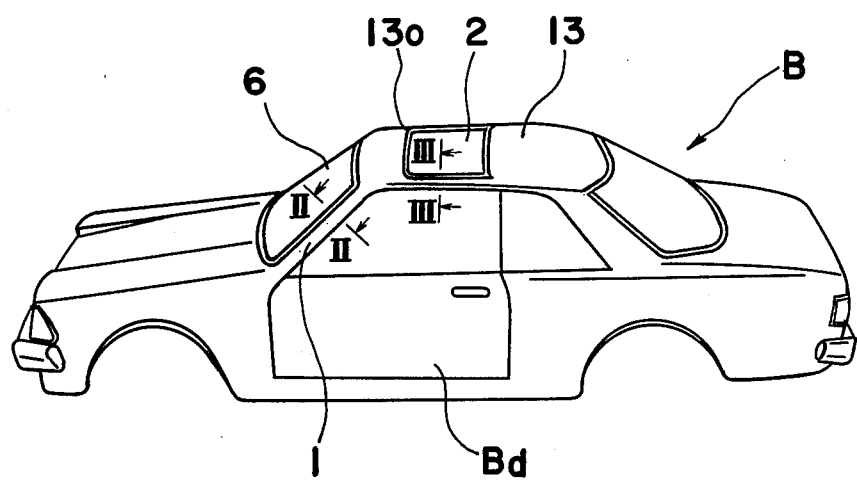
FIG. 1 is a perspective view of a vehicle body to which the pillar construction according to the present invention can be applied.

Referring now to the drawings, there is shown in FIG. 1 a vehicle body B which has front windshield pillars 1 (referred to as front pillars hereinbelow) at opposite sides of a front windshield 6, and an opening 13o formed in a vehicle roof 13 and provided with a cover plate member 2 for selective opening and closing of said opening 13o.

Figure 2:
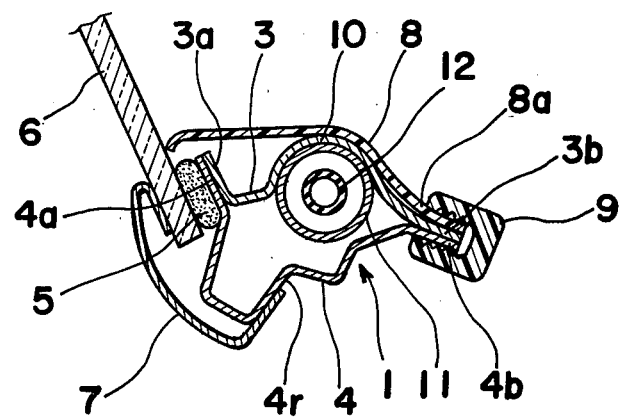
FIG. 2 is a cross sectional view taken along the line II—II of FIG. 1.

As shown in FIG. 2, each of the front pillars 1 according to the present invention includes a pillar inner panel 3 of metallic material having front and rear flange or edge portions 3a and 3b and a pillar outer panel 4 also of metallic material having front and rear flange or edge portions 4a and 4b, with the edge portions 3a and 4a, and 3b and 4b being rigidly connected by suitable means to define a closed cross section as shown. On the edge of the front pillar 1 defined by the connected edge portions 3a and 4a of the pillar inner panel 3 and pillar outer panel 4 and to the outer surface of the edge portion 4a, a corresponding edge of the front windshield 6 is fixed by a bonding material 5, and a covering member 7 is secured, at its opposite edges, between a portion adjacent to the edge of the front windshield 6 and an intermediate bent or rib portion 4r of the pillar outer panel 4 for covering the junction between the front windshield 6 and the front pillar 1. Moreover, a pillar trim member 8 is provided to cover the surface of the pillar inner panel 3 inside the motor vehicle, and the edge 8a of the pillar trim member 8 and the edge portions 3b and 4b of the front pillar 1 at the side of a vehicle door Bd (FIG. 1) are secured to each other by fitting thereon a connecting member 9 of resilient material having a U-shaped cross section. The pillar inner panel 3 is provided with a raised or inwardly curved portion 10 of arcuate cross section extending vertically over the entire length thereof and protruding toward the vehicle interior as shown. To the inner surface of the raised portion 10 is fixed the outer peripheral surface of a reinforcing pipe of metallic material 11, for example, by spot welding during manufacture so as to extend the entire length of the pillar inner panel 3, and by combining the pillar inner panel 3, to which the metallic pipe 11 has been welded in the above described manner, with the pillar outer panel 4 at the edge portions 3a and 4a, and 3b and 4b for rigid connection therebetween as described earlier, the front pillar 1 having the metallic pipe 11 fixed to the inner surface of its closed cross section is formed. It is to be noted here that the thickness of each of the pillar inner panel 3 and pillar outer panel 4 is made as small as practicable so a sufficient space is provided between the panels 3 and 4 for passing the metallic pipe 11 therethrough. A drain pipe 12, for example, of vinyl material or the like, is passed through the interior of the metallic pipe 12 for draining rain water or the like collected around the cover plate member 2 provided on the roof 13 of the vehicle body B in a manner as described hereinbelow.

Figure 3:
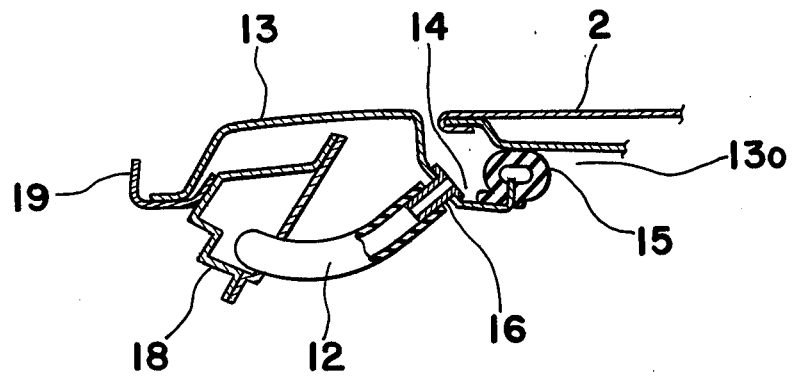
FIG. 3 is a cross sectional view taken along the line III—III of FIG. 1.

As shown in FIG. 3, the drain pipe 12 is connected, at its one end, to a drain plug 16 fixed to the roof 13 at the lower portion of a drain trough 14 defined between the roof 13 and one edge of the cover member 2 and separated from the vehicle interior by a sealing member 15, and, after having passed through the interior of side rails 18 each provided horizontally at opposite sides of the roof 13 adjacent to rain rails 19, extends through the metallic pipe 11 provided in the front pillar 1 as described earlier.

It is to be noted here that the cover plate member 2 described above may be any type such as sliding type, a releasable type or the like as long as it serves the purpose for selectively opening and closing the opening 13o formed in the vehicle roof 13, and allows the drain trough 14 to be provided with respect to the vehicle roof 13 for communication with the drain pipe 12.

It should also be noted that, although the present invention has been mainly described with reference to the construction of the front pillars in the foregoing embodiment, the present invention is not limited in its application to the front pillar alone, but may readily be applicable to rear windshield pillars, etc.

Needless to say, the pillar inner panel and pillar outer panel and the reinforcing pipe member described as formed by metallic material may be replaced by those corresponding parts, made of other rigid material such as plastics, etc. depending on necessity, with the pipe member rigidly bonded to the pillar inner panel by bonding material or other suitable means.

As is clear from the foregoing description, in the pillar construction according to the present invention as described above, since the pillar is reinforced by the metallic pipe, the strength and rigidity thereof is markedly improved, and undesirable vibrations of the vehicle body are prevented during the high speed driving, while even when the cover plate member is provided, the impact resistance of the pillars during opening and closing of the cover plate member is greatly increased. Furthermore, the metallic pipe passed through the interior of the pillar for the reinforcement makes it unnecessary to increase the width of the pillar as in the conventional constructions, and allows the pillar to be made narrower, with consequent improvement of visibility and external appearance. Moreover, the arrangement in which the drain pipe is passed through the interior of the metallic pipe is effective for reducing the noise of drain water flowing through the drain pipe.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as being included therein.

What is claimed is:

1. A roof and pillar structure for use in a motor vehicle which comprises: a roof having an opening therein adapted to be closed by a movable closure means and having a drain trough around the periphery of said opening; a pillar attached to a corner of said roof and having a pillar inner panel and a pillar outer panel rigidly connected to each other so as to define a closed cross section therebetween, said pillar inner panel being formed with a portion of arcuate cross section extending along the entire length of said pillar inner panel and protruding toward the interior of the motor vehicle; a reinforcing pipe member welded along the inner surface of said arcuate cross section portion for fixing said pipe member to the interior of said closed cross section defined by said pillar inner panel and pillar outer panel for reinforcement of said pillar; and a drain pipe extending through the interior of said pipe member and communicated with said drain trough.

2. A structure as claimed in claim 1, wherein said pillar is a front windshield pillar provided at each of opposite sides of a front windshield of the motor vehicle.

3. A structure as claimed in claim 1, wherein said pillar is a rear windshield pillar provided at each of opposite sides of a rear windshield of the motor vehicle.

4. A structure as claimed in claim 1, wherein said pillar inner panel is covered at its surface toward the interior of the motor vehicle with a pillar trim member.

5. A structure as claimed in claim 1, wherein said pillar outer panel is covered, at part of its surface toward the exterior of the motor vehicle, with a covering material.

* * * * *